Aug. 30, 1955     I. CISSKI     2,716,351
MOTION PICTURE CAMERA GEAR MESH ADJUSTMENT
Filed Feb. 14, 1951

Irving Cisski
*INVENTOR.*

BY

ATTORNEYS

United States Patent Office 2,716,351
Patented Aug. 30, 1955

2,716,351

MOTION PICTURE CAMERA GEAR MESH ADJUSTMENT

Irving Cisski, Schiller Park, Ill., assignor to Ampro Corporation, Chicago, Ill., a corporation of Illinois Application February 14, 1951, Serial No. 210,980

7 Claims. (Cl. 74—400)

The present invention relates to motion picture cameras of portable and inexpensive type, and particularly to arrangements providing for positional adjustment of plural driven gears that respectively constitute the power inputs to mechanism sub-assemblies with respect to the single output gear of a motor and turns-increasing mechanism sub-assembly by which such input gears are to be driven. Specifically the invention relates to adjustment between gears that rotate about angularly related axes.

Two general types of procedure are available for manufacturing motion picture camera mechanism sub-assemblies to accomplish proper meshing of angularly related gears that respectively are elements of the different sub-assemblies. One is high precision manufacture in which tolerances of the mechanical elements and of their locations and mountings are maintained sufficiently close to assure proper meshing of the cooperative gears of the various sub-assemblies when the latter are secured together. Such manufacture is very costly and results in an expensive product. The second method is manufacture under tolerances sufficiently liberal to result in economical production, and to make provision for adjusting the relative positions of the cooperating gears of the respective sub-assemblies after the latter have been secured together. The present invention relates to this second type of manufacturing procedure.

The prior practice of adjusting mesh of cooperating gears of different motion picture camera sub-assemblies has comprised mounting one such gear for axial movement toward the angularly related cooperating gear, and relative to structure supporting the shaft on which the gear is mounted, and to insert between the gear and supporting structure one or more spacer washers, known as "tolerances washers," to fix the position of the axially movable gear relative to the other gear by positively spacing the former from the support structure. Since this type of mesh adjustment requires that the gear-supporting shaft be dismounted from the supporting structure for threading of the washers onto it, and requires either measurement or trial and error procedure, it is time consuming. It also requires exercise of a substantial degree of skill and experience.

A primary object of the present invention is the provision of a motion picture camera mechanism comprising plural sub-assemblies each of which has a gear that is to mesh with a gear of another sub-assembly and which meshing gears are disposed for rotation about angularly related axes, with novel means providing for simple, accurate and readily made gear mesh adjustment that can be made after the sub-assemblies have been secured together, and that can be made from the outside of the mechanism without disassembling any part of it.

Another object is the provision of a novel arrangement in motion picture camera mechanism, permitting relative adjustment for proper meshing with a single crown gear that is the output element of a motor and turns-increasing mechanism sub-assembly, of a pinion that is the input element of a film transport and shutter mechanism assembly, and a pinion that is the input element of a speed governor mechanism sub-assembly.

Figures 1, 2, 3, 4:
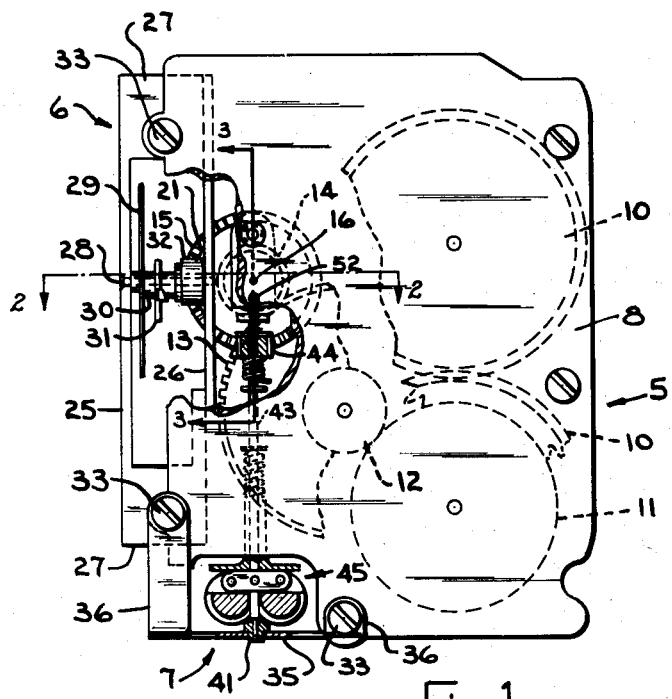
Fig. 1 is a partially broken side elevation of a motion picture camera mechanism assembly embodying the invention.
Fig. 2 is an enlarged horizontal partially broken section on line 2—2 of Fig. 1.
Fig. 3 is a vertical section on line 3—3 of Fig. 2.
Fig. 4 is a fragmentary section similar to Fig. 3 showing an unadjusted condition of the governor shaft support.

Describing the drawings in detail, the mechanism assembly of Fig. 1 comprises a motor and turns-increasing sub-assembly 5, a transport and shutter mechanism sub-assembly 6, and a speed governor mechanism sub-assembly 7. Each of these assemblies comprises operating mechanism for performing the function of the sub-assembly, and supporting structure that not only affords support for such mechanism but that also so positions such mechanism that when the respective supporting structures are secured together, as in Fig. 1, power input mechanism elements of the two sub-assemblies 6 and 7 are located for driving by the output element of sub-assembly 5.

The supporting structure of the motor and turns-increasing sub-assembly 5 comprises a first side plate 8 and a second side plate 9, such plates being spaced apart for supporting mechanism shafts that extend between them. The mechanism of sub-assembly 5 supported by such shafts comprises a pair of tandem-coupled spring motor assemblies 10. The output of the two motors is taken from a gear 11 connected with one of them. Gear 11 rotates a driven gear 12 that is rigidly coupled with a co-axial driving gear 13 and the latter rotates a driven gear 14. Gear 14 constitutes an element of a rotatable crown gear assembly that is the power output element of sub-assembly 5. This rotatable crown gear assembly includes a crown gear 15 that is secured to gear 14 and disposed between and spaced from side plates 8, 9 and that is supported by a shaft 16 both for axial movement and for rotation about the shaft axis. In the arrangement shown shaft 16 is rigidly secured at one end in a supporting flange 17 swaged into an opening in the second side plate 9 and has its other end supported in a bore 18 in the first side plate 8. An extension of gear 14 is press fitted in a bore in crown gear 15, and bushings 20 that movably surround shaft 16 are press fitted in a central bore extended through gear 14. Crown gear 15 has teeth 21 that project laterally of the gear body and in the direction of the first side plate 8. The crown gear assembly has an end surface 22 that faces the inner surface of bearing flange 17 and that may be provided by a projecting end of the adjacent bushing 20. A thrust washer 23 is interposed between surface 22 and the flange 17.

The transport and shutter sub-assembly 6 comprises supporting structure providing spaced front and rear walls 25, 26 and top and bottom parts 27 connecting such walls. A shaft 28 is extended between and journalled in walls 25, 26 and carries a shutter 29 and a cam device 30 for actuating a film transport shuttle shown somewhat schematically at 31. A pinion 32 also is carried by shaft 28 and this pinion constitutes the power input element of the mechanism of sub-assembly 6, and is disposed for meshing with crown gear 15 when sub-assemblies 5, 6 are secured together, as they are shown to be in Fig. 1 by screws 33. Screws 33 serve to relatively position the sub-assemblies for such meshing as well as to secure them together.

The supporting structure of the speed governor sub-assembly 7 comprises a bottom plate 35 having members for securement by screws 33 to the supporting structure of sub-assemblies 5 and 6, such members being shown as flanges 36. Cooperative with structural plate 35 of the sub-assembly 7 is a bracket 37, best shown in Fig. 3, that is supported on the first side plate 8. Bracket 37 comprises a deflectable and somewhat resilient body including a reach 38 that is secured to side plate 8, an offset reach 39 that is spaced from the inner surface of side plate 8 and a bifurcated portion 40 that extends from reach 39. In manufacture reaches 38, 39 are so angularly related that reach 39 inclines downward and inward toward side plate 8, as shown in Fig. 4. Sub-assembly structural plate 35 and the bifurcated bracket portion 40 support bearings 41, 42 for rotatably mounting a speed governor shaft 43. A pinion 44 secured on the governor shaft is located for driven meshing with crown gear 15 when sub-assembly 7 is secured to sub-assemblies 5 and 6. A governor weight and braking assembly 45 is mounted on shaft 43. When sub-assemblies 5, 6 and 7 are manufactured to tolerances in the relative location of the bores provided for receiving screws 33, and of crown gear 15 and pinions 32 and 44, and of the mechanical elements that support them, that are sufficiently liberal for low cost production, substantial variance occurs from proper meshing of pinions 32 and 44 with crown gear 15. The invention now to be disclosed provides adjustments to compensate such tolerance variations and to bring the pinions and gear into correctly meshing relationship.

As stated above, the crown gear assembly is mounted for axial movement relative to the side plates 8, 9. Such movement permits axial adjustment of crown gear 15 relative to pinion 32 in directions extended axially of shaft 16. For accomplishing such adjustment a thrust device is supported by the second plate 9 for accomplishing the positional adjustment of the crown gear. In the form shown the thrust device comprises a pair of screws 50 extended through and in threaded engagement with supporting flange 17 adjacent and in diametrically opposite relation to shaft 16. Screws 50 have inner end portions for exerting thrust against the crown gear assembly, through washer 23 and upon end surface 22, and outer portions that are exposed at the outer side of flange 17 and that therefore are accessible from the outer side of plate 9 for adjustment of the axial positions of screws 50 and of the crown gear. In manufacturing the sub-assembly 5, screws 50 are axially positioned with their inner end portions withdrawn into supporting flange 17. After sub-assemblies 5, 6 are secured together the screws are advanced until the crown gear is positioned in proper meshing relation with pinion 32. The thrust developed between the pinion 32 and crown gear 15 maintains surface 22 against the washer and screws 50.

To provide an adjustment for accomplishing a proper mesh of governor pinion 44 with crown gear 15 in a position to which the latter has been adjusted to mesh with pinion 32, a thrust device is supported by the first side plate 8 for moving the bifurcated bracket portion 40 in a direction extended axially of a shaft 16, so that the bearing 42, the upper end of shaft 43 and pinion 44 may be moved to positions for accomplishing such mesh. The thrust device is shown as comprising a screw 52 extended through and in threaded engagement with side plate 8. Screw 52 has an inner end portion bearing on bracket reach 39 and deflecting the latter to accomplish the adjustment movement of bracket portion 40, and has an outer portion accessible from the outer side of plate 8 for adjusting the axial position of the thrust device to properly mesh pinion 44 with crown gear 15. The arrangement of bracket 39 is such that when the bifurcated portion is in the range of positions wherein proper gear mesh is accomplished, it will be approximately at right angles to side plate 8, and bracket reach 39 will be substantially parallel to plate 8, as seen in Fig. 3. When in this adjusted position the tension developed in bracket 37 by its deflection not only maintains reach 39 against the end of screw 52, but also is sufficient to lock screw 52 against rotation by the thrust exerted on it.

It is to be noted that the total length of governor shaft 43 is very greatly in excess of the length of such shaft surrounded by lower bearing 41. An ordinary free-running fit of the shaft in bearing 41 is ample to avoid binding of the shaft in the bearing throughout the range of movement of the upper shaft end for the described mesh adjustment purposes.

The point of attachment of bracket reach 39 to side plate 8 is spaced to the opposite side of shaft 16 from bifurcated bracket portion 40, and shaft 16 extends through an opening 53 in bracket reach 39. To properly align governor shaft 43 with a radius of shaft 16, and since bracket 39 is secured to plate 8 by a single rivet 54 which might act as a pivot, the vertical sides of opening 53 are spaced apart a distance equal to the diameter of shaft 16. In this way bracket 37 is maintained in a position to hold bearing 42 and shaft 43 properly related to shaft 16. Opening 53 is vertically elongated to provide clearance in the adjustment movement of bracket reach 39.

I claim:

1. In a motion picture camera motor and turns-increasing sub-assembly that includes as an output element a crown gear that is supported by a shaft extended inward from an external supporting structure and for rotation and axial movement relative to the axis of said shaft, and said gear having an end surface facing said supporting structure; means for adjusting the axial position of said gear relative to the supporting structure comprising a screw extended through and in threaded engagement with said structure adjacent and parallel to said shaft, said screw having an inner end inside said structure and an outer end accessible from the outer side of said supporting structure for rotation of the screw, and means for transmitting thrust from said inner screw end to said crown gear end surface.

2. In a motion picture camera mechanism assembly including a motor and turns-increasing sub-assembly having an external side plate and having as an output element a crown gear supported by a shaft extended inwardly at right angles relative to said plate, said gear being rotatable and axially movable relative to the shaft axis and having an end surface facing said plate, and a transport and shutter mechanism sub-assembly including supporting structure secured to said side plate and an input pinion supported by said structure for rotation about an axis extended at right angles to said shaft and the location of which relative to said plate is determined by the plate and said supporting structure; means for adjusting the mesh between said gear and pinion comprising a thrust device mounted in said plate adjacent said shaft for axial movement relative to the latter, said thrust device being extended through said plate and having an inner portion and an outer portion accessible from the external side of the plate for adjustment of the axial position of said inner portion, and means for transmitting motion from said inner portion to said crown gear.

3. In a motion picture camera mechanism that includes a motor and turns-increasing mechanism sub-assembly having as an output element a crown gear supported by a shaft extended inward from an external mechanism-supporting plate for rotation and axial movement relative to the axis of said shaft, and a governor mechanism including a shaft rotatable about an axis disposed at right angles to the axis of rotation of said gear and a pinion mounted adjacent an end of said governor shaft for meshing with said gear; means supporting said shaft and adjacent said gear and for lateral movement in a direction extended axially of said gear-supporting shaft for adjusting mesh between said pinion and gear, comprising a bracket member secured to said plate adjacent said governor shaft, said bracket member including a reach extended between said bearing and the point of securement of the member to the plate, said reach facing the inner surface of said plate and being deflectable, and a thrust member mounted in said plate for movement in a direction extended axially of said gear-supporting shaft, said thrust member having an outer portion accessible from the external side of the plate and an inner portion disposed for contact and deflection of said bracket member reach to move said bearing.

4. In a motion picture camera mechanism that includes a motor and turns-increasing mechanism sub-assembly having as an output element a crown gear supported by a shaft extended inward and substantially at right angles from an external mechanism-supporting plate for rotation and axial movement relative to the axis of said shaft, and a governor mechanism including a shaft rotatable about an axis disposed at right angles to the axis of rotation of the crown gear and a pinion mounted adjacent an end of said governor shaft for meshing with the crown gear; means supporting said governor shaft and for lateral movement in directions extended axially of said gear-supporting shaft for adjusting mesh between said pinion and gear, comprising a bracket member secured to said plate adjacent said gear-supporting shaft, said bracket comprising a plate of resilient material formed to include a mounting portion secured in face-to-face relation with said supporting plate and an intermediate reach connected to said mounting portion and biased by resilience of said bracket plate toward a position inclined relative to said supporting plate and an end portion angularly related to said intermediate reach, a bearing mounted on said end portion and surrounding said governor shaft adjacent its said end, and a screw threaded through said supporting plate and having an inner end disposed to exert thrust on said intermediate bracket reach to deflect it away from its inclined position to move said bearing, governor shaft and pinion.

5. In a motion picture camera mechanism that includes a motor and turns-increasing sub-assembly having as an output element a crown gear supported by a shaft extended inward from an external mechanism-supporting plate for rotation and axial movement relative to the axis of said shaft, and a governor mechanism including a shaft rotatable about an axis disposed radial to the axis of rotation of said gear and a pinion mounted adjacent an end of said governor shaft that is adjacent the end of said gear supporting shaft and for meshing with said gear; means supporting said governor shaft end for lateral movement in a direction extended axially of said gear-supporting shaft for adjusting mesh between said gear and pinion, comprising a bracket member including a portion secured to said supporting plate to the opposite side of the gear-supporting shaft from said governor shaft end and having an intermediate reach offset from said portion and spaced from said plate, said intermediate reach extending past the gear-supporting shaft and having an opening through which the latter extends, and said bracket including an end portion projecting angularly from said intermediate reach, a bearing mounted on said end portion and surrounding the governor shaft adjacent its said end, said intermediate reach at opposite sides of said opening contacting the gear-supporting shaft and positioning the axis of the governor shaft and said bearing in radial relation to the axis of the gear-supporting shaft, and means mounted on said supporting plate for movement axially of the gear-supporting shaft and disposed to move the intermediate bracket reach for adjustment of said bearing, governor shaft and pinion relative to said gear.

6. In a motion picture camera mechanism that includes a gear couple of a crown gear assembly supported for rotation about the axis of shaft projecting inward from an external supporting plate and a pinion supported by structure assembled with said plate for rotation about an axis extended substantially at right angles to the axis of said shaft, said gear assembly and pinion including rotatable portions provided with matching teeth that project into meshing relation and means supporting the tooth portions of the gear assembly and pinion for relative movement in directions extended parallel to the axis of said shaft; means for adjusting the mesh between the teeth of the respective assemblies comprising a thrust member supported by said plate adjacent and for movement parallel to said shaft, said thrust member having an outer portion accessible from the outer surface of the plate for adjusting the position of the member and an inner portion disposed for contacting and moving the support means of one said assembly for moving the tooth portion of that assembly toward the tooth portion of the other assembly.

7. In a motion picture camera mechanism that includes a crown gear supported for axial movement and rotation relative to the axis of a shaft that supports it and that is extended transversely between first and second side plates, and which gear at one end has teeth projecting toward a first one of said side plates and at the other end has a surface facing the second side plate, and said mechanism also including a transport and shutter mechanism sub-assembly that includes supporting structure secured to the said side plates and a first pinion meshed with said crown gear and rotatable about a second axis extended substantially at right angles to said shaft axis and the position of which axially of said shaft is determined by said supporting structure, and governor mechanism including a drive shaft carrying a second pinion located between the first side plate and the crown gear and meshed with the latter and drive shaft-supporting structure assembled with said side plates and supporting said drive shaft with the axis angularly spaced from said second axis and disposed substantially at right angles to said axis of gear rotation and including a bearing surrounding the drive shaft; mesh-adjusting means comprising a first thrust device supported by the second side plate adjacent the gear-supporting shaft for movement in directions extended axially of the latter, said first thrust device having an outer portion accessible from the outer side of said second side plate for adjustment of its position and an inner portion disposed for exerting thrust upon said crown gear and surface, means supporting said bearing and movable axially of said gear-supporting shaft, and a second thrust device supported by the first side plate adjacent the gear-supporting shaft for movement in directions extended axially of the latter, said second thrust member having an outer portion accessible from the outer side of said first side plate for adjustment of its position and an inner portion disposed to contact said bearing-supporting means for moving the latter to adjust the position of the second pinion relative to the crown gear.

References Cited in the file of this patent

UNITED STATES PATENTS

| Number | Name | Date |
|---|---|---|
| 721,968 | Round | Mar. 3, 1902 |
| 822,974 | Morgan | June 12, 1906 |
| 1,280,342 | Catucci | Oct. 1, 1918 |
| 1,327,129 | Wolff | Jan. 6, 1920 |
| 1,632,164 | Benjamin et al. | June 14, 1927 |
| 2,181,424 | Glacy et al. | Nov. 28, 1939 |

FOREIGN PATENTS

| Number | Country | Date |
|---|---|---|
| 128,800 | Great Britain | July 3, 1919 |
| 522,099 | Great Britain | June 10, 1940 |